Patented Apr. 14, 1942

2,279,532

UNITED STATES PATENT OFFICE 2,279,532

CLEANING COMPOSITION

Harry A. Seran, Cucuta, Colombia

No Drawing. Application May 4, 1940,
Serial No. 333,426

4 Claims. (Cl. 252—94)

The present invention relates to a material highly suitable for cleaning fabrics, and particularly intended for use as a cleaner for white shoes, particularly for white shoes the uppers of which are made of textile fabric. It is well known that white shoes are largely worn in the summer time in temperate climates, and are worn practically throughout the year in hot climates, and it is well known to be difficult to prevent white shoes from getting spotted or stained with various materials such as dirt, grease, road oil and various other materials, which are removable from the same only with difficulty. For white shoes to be presentable they must be kept very clean. Merely coating over the dark spots does not give altogether satisfactory results.

According to the present invention, there is produced a product which can readily be used for the removal of spots from shoes of the kind indicated, which material can also be used for removing spots from other fabrics such as white duck pants and the like, and also thin fabrics, e. g., silk dresses.

The preferred composition of my product is as follows, the parts being by weight:

| | Parts by weight |
|---|---|
| Phosphorus sesquisulphide | 4½ |
| Potassium chlorate | 10 |
| Iron oxide | 5 |
| Zinc oxide | 3 |
| Glass powder | 7½ |
| Glue | 10 |
| Water | 20 |
| Asbestos | 40 |

In place of the phosphorus sesquisulphide ($P_2S_3$) pentasulphide of phosphorus can be employed. A mixture of red phosphorus and flowers of sulphur or powdered sulphur can be used, but these substitutes are not quite as good as phosphorus sesquisulphide.

In place of the zinc oxide and iron oxide, other mildly abrasive pigments can be used, in a finely powdered condition, such as whiting, ochre, megnesia, alumina or the like. The iron oxide and zinc oxide however are preferred, in spite of the fact that the iron oxide has a color, and gives the final product a reddish color.

In place of the glass powder, ground quartz or powdered pumice can be used.

In place of the glue, soluble gums such as gum arabic, gum acacia and the like can be employed.

The asbestos is preferably used in the form of a powder, say 100 mesh or finer. As substitutes talc or china clay could be used.

The substitutions referred to above, do not appear, in any case, to be quite as good as the substances stated in the preferred formula. The proportions given in the formula can be varied more or less, without departing from the spirit of the invention.

The materials are mixed together after being separately ground in a dry condition, for example the dry substances can be separately ground in a clean and dry mortar, using a clean and dry pestle. Preferably each of the materials has been separately ground to a fine powder, and the powders can be mixed together in the proportions indicated above, while in a dry state. The glue can however be first dissolved in water and added to the mixture of the other powdered components, before or during a mixing operation, and the so-moistened materials are then preferably made up into a stick, by being forced into a mold under high pressure. A convenient form is a stick of about 10 centimeters in length, square in cross-section, and about 1 centimeter on a side. The dry materials, thoroughly mixed together, can also be used in powder form if desired, a wet cloth being dipped into the powder and the spot rubbed with the same, preferably working on a small spot at a time, until removed. When used in the form of a stick, which is the preferred form, the stick is dipped into water, and then rubbed upon the spot, and worked around and back and forth on the spot until the same is removed or loosened. After this, the white shoes, etc., are well washed with clear water, to wash off the entire residue of the cleaning composition, including the iron oxide. Then the shoes are dried, and can be polished with any of the usual well-known white shoe polishes. The composition here given is not a shoe polish, but a shoe cleaner. When thinner fabrics such as silk and the like are being cleaned, the rubbing of course should be done in a gentle manner, and after sufficiently loosening or removing the spot, the material should be allowed to dry and then brushed off. The material will not produce rings, either on silk or linen fabrics. In grinding the materials, as in a mortar, it will be obvious that the phosphorus sesquisulphide and potassium chlorate will not be first mixed together and then ground, which would produce explosions. However after diluting each of these with the other components present, they can be ground together, but it is not necessary to do so, and generally is not advisable.

I claim:

1. A composition of matter adapted for the cleaning of fabric articles comprising the following ingredients in substantially the proportions:

| | Parts by weight |
|---|---|
| Phosphorus sesquisulphide | 4½ |
| Potassium chlorate | 10 |
| Iron oxide | 5 |
| Zinc oxide | 3 |
| Glass powder | 7½ |
| Glue | 10 |
| Water | 20 |
| Asbestos | 40 |

2. Product as set forth in claim 1, molded into stick form.

3. A composition of matter adapted for the cleaning of fabric articles comprising the following ingredients in substantially the proportions:

| | Parts by weight |
|---|---|
| Phosphorous pentasulfide | 4½ |
| Potassium chlorate | 10 |
| Iron oxide | 5 |
| Zinc oxide | 3 |
| Glass powder | 7½ |
| Glue | 10 |
| Water | 20 |
| Asbestos | 40 |

4. A composition of matter adapted for the cleaning of fabric articles comprising the following ingredients in substantially the proportions:

| | Parts by weight |
|---|---|
| Sulfide of phosphorus | 4½ |
| Potassium chlorate | 10 |
| Iron oxide | 5 |
| Zinc oxide | 3 |
| Glass powder | 7½ |
| Glue | 10 |
| Water | 20 |
| Asbestos | 40 |

HARRY A. SERAN.